United States Patent [19]

Nokovich

[11] Patent Number: 4,621,549
[45] Date of Patent: Nov. 11, 1986

[54] PRECISION INTERNAL TUBE CUTTER
[75] Inventor: Nick Nokovich, Greensburg, Pa.
[73] Assignee: Westinghouse Electric Corp., Pittsburgh, Pa.
[21] Appl. No.: 649,865
[22] Filed: Sep. 12, 1984

Related U.S. Application Data

[63] Continuation-in-part of Ser. No. 544,166, Oct. 21, 1983, abandoned.

[51] Int. Cl.$^4$ .................. B23D 21/08; B23D 21/14
[52] U.S. Cl. ......................................... 82/1.2; 30/107
[58] Field of Search ........................... 82/1.2, 4 C, 82; 30/103–107; 408/150, 159, 162

[56] References Cited

U.S. PATENT DOCUMENTS

| | | |
|---|---|---|
| 334,928 | 1/1886 | Baughman . |
| 340,344 | 9/1886 | Mineo .................................. 30/107 |
| 455,640 | 7/1891 | Rohland . |
| 560,099 | 5/1896 | Kranzer ................................ 30/107 |
| 565,850 | 8/1896 | Fitzpatrick ........................... 30/107 |
| 647,104 | 4/1900 | Miller .................................... 30/107 |
| 655,600 | 8/1900 | Brown et al. . |
| 672,448 | 4/1901 | MacKenzie . |
| 837,426 | 12/1906 | Seymour . |
| 890,795 | 6/1908 | Putsch .................................. 30/107 |
| 914,328 | 3/1909 | Barnes . |
| 941,845 | 11/1909 | Barnes . |
| 1,004,782 | 10/1911 | Hardison . |
| 1,126,649 | 1/1915 | Musser et al. . |
| 1,457,258 | 5/1923 | Mayher ................................. 30/107 |
| 2,046,241 | 6/1936 | Beard . |
| 2,130,580 | 9/1938 | Buckles . |
| 2,247,283 | 6/1941 | Young ................................... 82/1.2 |
| 2,568,683 | 9/1951 | Mayher . |
| 2,744,425 | 5/1956 | Wragg . |
| 3,481,225 | 12/1969 | Molloy . |
| 3,939,561 | 2/1976 | Nichols ................................. 30/107 |

FOREIGN PATENT DOCUMENTS 2012643  3/1971  Fed. Rep. of Germany .

Primary Examiner—Francis S. Husar
Assistant Examiner—Jerry Kearns

[57] ABSTRACT

A precision internal tube cutter can sever an upper end portion of a guide thimble inserted and attached within a passageway of a top nozzle adapter plate of an irradiated fuel assembly so as to facilitate reconstitution of the fuel assembly. Further, the upper end portion of the thimble can be cut without producing any burrs, roughness or distortion at the cut end. The cutter includes a body with upper and lower end portions of greater diameter sizes than that of an intermediate portion which interconnects them. A stem extends into an axial bore formed longitudinally through the body. A radial slot is defined within the intermediate body portion. In one embodiment, a pair of slides each with a cutting wheel rotatably mounted thereto are mounted within the slot. A lower conical end of the stem engages the slides and axial movement of the stem will cause radial movement of the slides. The slides are urged toward inward retracted positions by return springs mounted on the intermediate portion of the cutter body. In a second embodiment, the tube cutter incorporates a slidable pin within an eccentric lower bore for actuating a single slide and cutting wheel. However, in both embodiments of the cutter, its body, stem and slide or slides are composed of a non-corrosive, anti-galling stainless steel alloy material which adapts the cutter to work for extended periods of time on an irradiated spent fuel assembly submerged in water.

1 Claim, 8 Drawing Figures

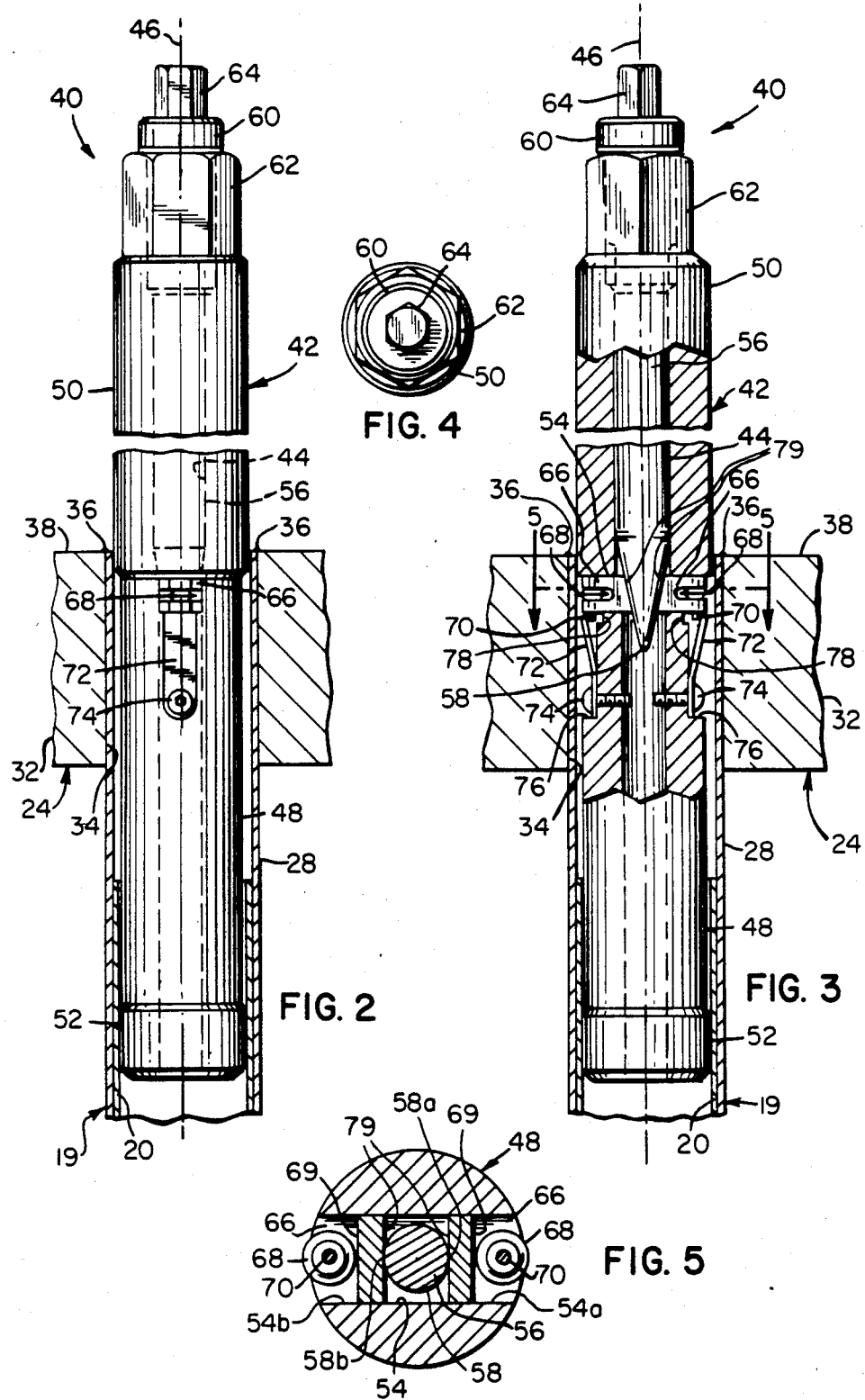

PRECISION INTERNAL TUBE CUTTER

This application is a continuation-in-part of copending U.S. patent application Ser. No. 544,166, filed Oct. 21, 1983 and now abandoned.

CROSS REFERENCE TO RELATED APPLICATIONS

Reference is hereby made to the following copending U.S. patent applications dealing with related subject matter and assigned to the assignee of the subject application:

1. "Reconstituting a Nuclear Reactor Fuel Assembly" by John M. Shallenberger et al, U.S. Ser. No. 422,224, filed Sept. 23, 1982.

2. "Apparatus and Method for Removing a Top Nozzle in Reconstituting a Fuel Assembly" by John M. Shallenberger, U.S. Ser. No. 654,708, filed Sept. 26, 1984.

BACKGROUND OF THE INVENTION

1. Field of the Invention

The present invention relates generally to reconstituting fuel assemblies for nuclear reactors and, more particuarly, is concerned with a precision internal tube cutter especially adapted for use in circumferentially cutting a guide thimble adjacent its region of attachment to the top nozzle of the fuel assembly without producing any burrs, observable roughness or distortion of the guide thimble at its severed upper end which facilitates reconstitution of the fuel assembly.

2. Description of the Prior Art

Nuclear reactors of the type utilized in power generation incorporate a large number of fuel assemblies arranged in a suitable configuration. Each fuel assembly includes numerous fuel rods, each of which comprises a stack of fuel pellets housed inside a hollow tube sealed by end plugs. The fuel rods are held in an organized array by a "skeleton" formed of grids spaced at intervals lengthwise along the fuel rods, control rod guide thimbles interconnecting the grids and extending beyond the opposite ends of the fuel rods, and top and bottom nozzles attached to the opposite ends of the thimbles. The guide thimbles may each include a tubular body which at its opposite ends is surrounded by and connected to sleeves which interconnect respective nozzles and adjacent grids.

The metal tubes of the fuel rods thus constitute the primary containment boundary for the radioactive nuclear fuel therein. During initial installation and periodic shutdown of the reactor for refueling, the fuel rods are inspected for damage which might allow leakage and thus contamination of the primary coolant. Fuel rods may develop cracks, pin holes, or other defects during service which must be detected, but which is difficult because they are part of the integral fuel assemblies and because irradiated fuel assemblies must be submerged in neutron absorbing liquid such as water. When such defects are detected, it is often necessary to remove and replace the entire fuel assembly in view that attempted repair often causes further damage which renders it unfit for further use. This, of course, is extremely time-consuming and expensive. Fuel assemblies incorporating special design features to facilitate reconstitution have been developed; however, such features add more expense and complication, and are unnecessary if the need for reconstitution does not arise.

As a result, there are many partially spent fuel assemblies stored in reactor plant spent fuel pools which have sustained damage and/or contain leaking fuel rods. These assemblies, which usually have weld-attached top nozzles, are unacceptable for reinsertion into the reactors by reason of their defective fuel rods. If the weld-attached nozzles on the assemblies could be removed in such a manner as to permit reattachment of replacement nozzles, the assemblies could be salvaged and reinserted into the reactors for the balance of their normal design life. Other potential advantages could be realized if replacement nozzles could be reattached to irradiated assemblies, such as the rearrangement or replacement of selected fuel rods for extended burnup.

A method has been developed by Westinghouse, the assignee hereof, for remounting top nozzles on irradiated fuel assemblies, the method being described in the first patent application cross-referenced above. However, to remount nozzles it is necessary to have a reliable, precision means of cutting the guide thimbles without producing chips, burrs, or tube distortions that could interfere with mounting the close tolerance passageways in the top nozzle adapter plate over the cut upper ends of the guide thimbles. The close spacing of the guide thimbles does not permit precision external cutting, either simultaneously or individually.

A variety of devices have been developed over the years for internally severing pipes or the like. Representative of such devices are the ones disclosed and illustrated in U.S. Patents to Baughman (No. 334,928), Mackenzie (No. 672,448), Seymour (No. 837,426) and Buckles (No. 2,130,580). However, such prior art devices have not been suitable nor adapted for use in severing guide thimbles from the top nozzle of an irradiated fuel assembly. Prior art devices fail to address or even recognize the demands encountered while working in the severe and restrictive environment associated with nuclear fuel assemblies: tolerances between interfitting parts must be exceptionally close; introduction of foreign particles into the fuel assembly cannot be tolerated; jamming and binding of parts which slide and rotate relative to one another must be avoided; and all parts must be able to withstand and accommodate distortion due to constant irradiation by radioactive material and corrosive attack by fluids to which they are subjected and in which they are submerged.

Consequently, there is a need for a precision internal tube cutter which alleviates and accommodates the problems associated with nozzle removal in the environment of a nuclear fuel assembly, and thus makes it possible, at less cost and in a rapid, straightforward manner, to reconstitute fuel assemblies which do not incorporate special design features to facilitate such reconstitution.

SUMMARY OF THE INVENTION

The present invention provides a precision internal tube cutter which overcomes the foregoing and other difficulties associated with the prior art when working in the environment of a nuclear fuel assembly. The tube cutter of the invention is capable of working submerged under water or the like for extended periods of time without corroding. Also, it is particularly adapted to accommodate axial distortion of the tube to be cut during insertion of the cutter within the tube. Further, the cutter is adapted for use in cutting, from the inside and without creating chips, burrs, roughness or material distortion, the metal guide thimbles attached to the fuel assembly top nozzle in facilitating the reconstitution of the irradiated, partially spent fuel assembly of a nuclear reactor while the assembly is submerged in water at a work station.

Among the many features incorporated by the precision internal tube cutter of the invention, two are of particular importance. The first feature relates to the material composing the cutter. Specifically, the components of the cutter which contact and move relative to one another are made of an anti-galling stainless steel alloy such as Nitronic-60. This material alleviates the potential for galling which would likely occur if ordinary stainless steel was used due to the close fitting tolerances required between the components to achieve a precision cut without producing burrs and distortion which would prevent subsequent reattachment of a replacement nozzle. Galling is the term used to denote a high temperature oxidation of the contacting surface materials which produces binding or locking up of the surfaces to one another.

The second feature relates to the unique structural configuration of the cutter body. The body of the cutter is designed such that the cutter is precisely guided and supported within the tube in close fitting contact with the interior of the tube, while, at the same time, such close fitting frictional contact of the cutter with the tube interior is kept to a minimum. Such relationships are brought about by making the cylindrical portion of the cutter body which contacts the tube interior below the location of the cutting wheels and slides of the cutter of the mimimum axial length necessary for adequately guiding and supporting the cutter and accommodating axial distortions in the tube to be cut and by separating this lower end portion from an upper end portion of the cutter body which only extends into the tube for a short distance by an intermediate portion of the cutter body which supports the cutting wheels and slides, is relieved relative to the upper and lower portions so that it does not contact the tube interior and incorporates the greatest amount of the axial length of the part of the cutter body which extends into the tube. In such manner, close fitting tolerance between the cutter body and tube interior is maintained for achieving precision positioning of the cutter and precision cutting of the tube, while minimizing surface friction created by insertion and rotation of the cutter body within the tube. As a consequence, the likelihood of the cutter binding within the tube and the amount of torque required to rotate the cutter are both decreased, and the cutter can thus be operated manually and remotely without the aid of a power motor.

Accordingly, the present invention sets forth for use with an irradiated fuel assembly submerged in water and including a top nozzle having an adapter plate with a plurality of passageways defined through the adapter plate and a plurality of control rod guide thimbles with hollow upper end portions inserted in the passageways and attached to the top nozzle adapter plate at the upper ends of the passageways, a precision internal tube cutter which can sever the upper end portion of the guide thimble just below its circumferential region of attachment to the top nozzle adapter plate.

The tube cutter comprises: (a) an elongated body having an upper end portion, a lower end portion, an intermediate portion interconnecting the upper and lower end portions, and a longitudinal bore defined in the body so as to extend axially through the upper end portion and into at least the intermediate portion of the body; (b) the upper and lower end portions of the body being of generally cylindrical cross-sectional shapes and having respective diameter sizes which adapt them to closely fit within and make contact with the hollow upper end portion of one of the guide thimbles inserted and attached within one of the passageways of the top nozzle adapter plate; (c) the intermediate portion of the body being of a cross-sectional shape reduced in size relative to the respective diameter sizes of the upper and lower end portions which prevents it from making contact with the hollow upper end portion of the guide thimble, the intermediate portion having a radially extending slot formed therein which intersects the longitudinal bore; (d) a stem disposed within the longitudinal bore and having a portion intersecting the slot so as to divide the slot into opposite portions which are open at the exterior of the intermediate portion of the body, the stem being movable axially along the bore between an upper retracted position and a lower extended position, and the stem portion having opposite sides which communicate with the opposite slot portions; (e) a pair of slides mounted within the respective slot portions adjacent the respective opposite sides of the stem portion, the slides being movable radially between outward and inward positions upon corresponding movement of the stem between its lower and upper positions; (f) means mounted on the intermediate portion of the body and connected to the slides for normally biasing them toward their inward positions; (g) a pair of cutting wheels rotatably mounted on the respective slides so as to define a common cutting plane upon rotation of the body, the cutting wheels being disposed in outwardly advancing cutting positions which progressively sever the upper end portion of the guide thimble within the common plane as the respective slides are moved from their inward to outward positions and the cutter body is rotated, the cutting wheels being disposed in withdrawn positions when the respective slides are disposed in their inward positions; and (h) means defined on the sides of the stem portion for converting axial movement of the stem between its retracted and extended positions within the longitudindal bore into radial movement of the respective slides between their respective inward and outward positions.

Also, the lower and upper portions of the cutter body can be of different diameter sizes in order to closely fit, respectively, within the inside of the hollow body of the guide thimble and the inside of a hollow outer sleeve which surrounds and extends upwardly from the thimble body and is attached to the upper end of the top nozzle adapter plate passageway. Further, the elongated body, stem and slides, all of the movable components of the cutter with the exception of the cutting wheels, are composed of an anti-galling, non-corrosive stainless steel alloy, such as Nitronic-60.

These and other features, advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a side elevational view of the tube cutter of the present invention, showing the cutter in foreshortened form and disposed within the upper end portion of a guide thimble inserted and attached within a passageway of the top nozzle adapter plate, with the guide thimble and plate being illustrated in fragmentary, sectional form.

FIG. 3 is a side elevational view similar to FIG. 2, but showing the cutter in partially sectioned form and rotated approximately ninety degrees from its position in FIG. 2.

FIG. 4 is a top plan view of the tube cutter shown in FIG. 3.

FIG. 5 is an enlarged cross-sectional view of the tube cutter taken along line 5—5 of FIG. 3 in the direction of the arrows.

DETAILED DESCRIPTION OF THE INVENTION

Figure 1:
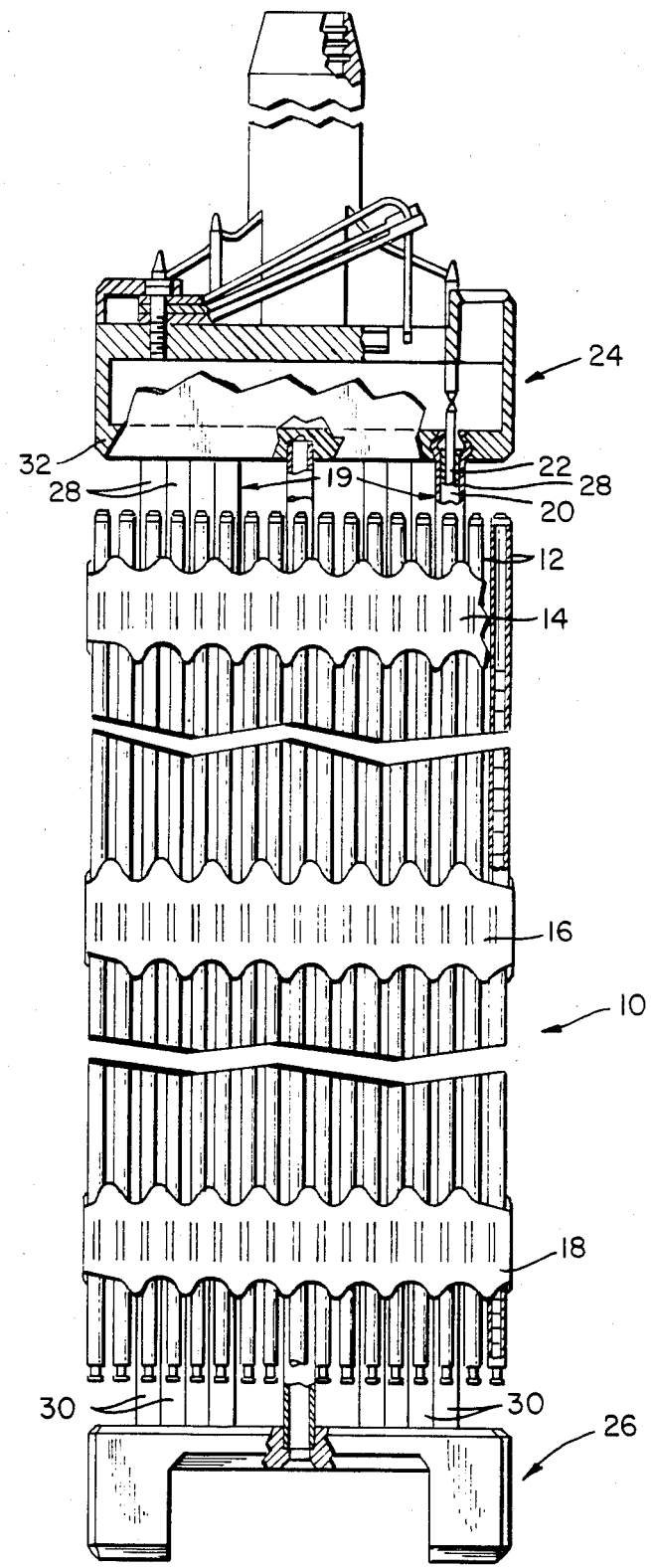
FIG. 1 is a partially sectioned elevational view, with parts broken away for clarity, of a fuel assembly which is reconstitutable using the precision internal tube cutter of the present invention.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a fuel assembly 10 of the type utilized in the nuclear reactor of a power generating plant. The fuel assembly 10 includes an array of fuel rods 12 held in parallel, closely spaced relation by grids 14,16 and 18 (only three of which are shown) located at intervals spaced along the length of the assembly. The fuel rods 12 are typically held in axial position relative to the grids 14,16,18 by springs (not shown). The grids 14,16,18 are rigidly interconnected by control rod guide tubes or thimbles 19 having a body 20, in which contol rods 22 are reciprocally movable for controlling the fission process. The guide thimbles 19 extend the full length of the fuel assembly 10 between a top nozzle 24 and a bottom nozzle 26. Each guide thimble 19 also includes a pair of hollow sleeves 28,30 which surround and are secured by welds or bulge fits (not shown) to opposite upper and lower ends of the guide thimble body 20. The sleeves 28,30 also interconnect the top and bottom nozzles 24,26 with respective adjacent grids 14,18. Thus, the respective opposite ends of the guide thimble bodies 20 are secured to corresponding thimble sleeves 28,30, which in turn are each secured between the respective adjacent nozzle and grid.

As will be explained more fully hereinafter, the present invention is directed to a precision tube cutter, being generally designated by the numeral 40 in FIGS. 2 and 3, which is particularly adapted for insertion into the upper end portion, such as the upper sleeve 28, of each of the guide thimbles 19 after removal of the control rods 22 therefrom for precisely servering the upper end portion just below its region of attachment to the adapter plate 32 of the top nozzle 24. The upper end portions of the guide thimbles 19, being inserted into respective passageways 34 in an adapter plate 32 of the top nozzle 24, are attached at the upper ends of the passageways 34 preferably by welds 36 (or any other suitable metallurical attachment) located at the adapter plate's upper surface 38. The tube cutter 40 is capable of precisely cutting the guide thimbles 19 without producing burrs or roughness on, or distortion of, their severed upper ends. In such manner, removal and replacement of the top nozzle 24 is made possible and reconstitution of the fuel assembly 10 is facilitated by the tube cutter 40.

Precision Internal Tube Cutters

Referring now to FIGS. 2-5, there is shown the precision internal tube cutter 40 of the present invention. In FIGS. 2 and 3, the cutter 40 is shown disposed in the upper portion of the thimble sleeve 28 and extending downwardly into the upper end of the thimble body 20. The thimble sleeve 28 and body 20 are both, in turn, inserted into one of the passageways 34 in the top nozzle adapter plate 32 and connected therein by the circumferential region of attachment 36 of the upper edge of the sleeve 28 to the adatper plate top surface 38. It will be noted that since the sleeve 28 surrounds the upper end of the body 20, the inside diameter of the sleeve is greater than that of the body.

The tube cutter 40 includes a generally cylindrical housing or body 42 having a central bore 44 formed therein coaxial with the longitudinal axis 46 of the body. The elongated, cylindrical body 42, composed of a noncorrosive, anti-galling stainless steel alloy, such as Nitronic-60 manufactured by ARMCO, is formed of an intermediate portion 48 which interconnects upper and lower end portions 50,52. As shown, the coaxial central bore 44 extends completely through the body 42; however, for reasons which will become apparent below, the bore 44 need only extend downwardly through the upper end portion 50 and into the intermediate portion 48 of the body 42. The upper and lower end portions 50,52 of the body 42 have generally cylindrical cross-sectional shapes with respective outside diameter sizes dimensioned relative to the respective inside diameters of the sleeve 28 and body 20 of the guide thimble 19 for close fitting contact therewith when placed in guiding relationship therein. The intermediate portion 48 of the body 42 is of a cross-sectional shape, preferably cylindrical, which is reduced in size relative to the respective diameter sizes of the upper and lower end portions 50,52. Therefore, the intermediate body portion 48 is spaced from and does not make contact with the inside of the guide thimble body 20 and sleeve 28. This spaced relationship has the effect of reducing the amount of frictional forces created between the cutter 40 and guide thimble 19. Also, the intermediate body portion 48 has defined therein a radially extending slot 54 which intersects the longitudinal bore 44.

Additionally, the tube cutter 40 includes a cyindrical stem 56 composed of the same noncorrosive, anti-galling stainless steel alloy as the body 42 and disposed within the central longitudinal bore 44. The stem 56 has a portion 58 which intersects the slot 54 of the intermediate body portion 48 so as to divide the slot 54 into opposite portions 54a,54b (FIG. 5) which are open at the exterior of the intermediate portion 48. The stem portion 58 has opposite sides 58a,58b (FIG. 5) which communicate with the opposite slot portions 54a,54b. The stem 56 is movable axially slong the bore 44 between an upper retracted position and a lower extended position. In FIG. 3, the stem 56 is shown between such extreme positions. The upper end of the stem 56 includes a flange 60 which functions as a stop for limiting downward movement of the stem. The stem 56 is threaded into the upper end of the bore 44 in a lug 62 integrally formed on the upper end portion 50 of the cutter body 42 and has a hex-shaped upper end 64 for engagement by a tool (not shown) to axially move the stem. Rotation of the stem 56 in one direction, such as clockwise as viewed looking down from the top in FIG. 3, moves the stem from its upper toward its lower position, whereas rotation of the stem in the opposite direction, such as counterclockwise, moves the stem in reverse, from its lower to its upper position. Parenthetically, it should be noted that the lug 62 on the cutter body 42 has a hex-shaped peripheral configuration which adapts it to also be engaged by a tool for rotating the cutter 40 to perform the cutting operation.

Still further, the tube cutter 40 includes a pair of slides 66 also composed of the same noncorrosive, anti-galling stainless steel alloy and mounted within the respective portions 58a,58b of the slot 58 adjacent the respective opposite sides 54a,54b of the stem portion 54 which intersects the slot 58. A pair of cutting wheels 68, preferably composed of ordinary stainless steel, are disposed in respective recesses 69 formed in the slides 66 and rotatably mounted therein by respective axle pins 70. The use of rotating or rolling cutter elements, constitutes another important feature of the inventon in that it contributes to achieving a higher cutting precision without causing burrs, roughness or distortion during cutting. The cutting wheels 68 protrude outwardly from and beyond the outer ends of the slides 66 and define a common cutting plane substantially perpendicular to the axis 46 of the cutter body 42 when the cutter 40 is rotated about that axis. The slides 66 which rotatably mount the cutting wheels 68 are movable radially within their respective slot portions 58a,58b between outward and inward positions. The cutting wheels 68 are disposed in outwardly advancing cutting positions which progressively sever the upper end of the guide thimble sleeve 28 within the common cutting plane as the respective slides 66 move from their inward toward their outward positions and the cutter 40 is rotated. On the other hand, the cutting wheels 68 are disposed in withdrawn, non-cutting positions when the respective slides 66 are disposed in their inward positions.

Means are included on the intermediate portion 48 of the tube cutter body 42 which function to normally bias the slides 66 toward their inward positions. Such means includes the lower ends of the axle pins 70 which protrude beneath their respective slides 66 and are engaged by the free ends of respective leaf springs 72. The springs 72 are secured by screws 74 recessed within respective notches 76 formed into the outside surface on diametrically opposed sides of the cutter body intermediate portion 48. As is best seen in FIG. 3, indentations 78 are provided in the notches 76 for receiving the lower ends of the axle pins 70 when the slides 66 and cutting wheels 68 are fully retracted to their respective inward and withdrawn positions. In summary, the slides 66 and cutting wheels 68 therewith are mounted for radial movement relative to the cutter body 42, and are normally urged toward their respective inward and withdrawn positions by the springs 72. The slides 66 are retracted sufficiently within the slot portions 54a,54b when at their inward positions that the cutting wheels 68 mounted thereon when at their withdrawn positons do not protrude radially outwardly beyond the upper and lower end portions 50,52 positions. Thus, the cutting wheels 68 when in their withdrawn positions do not obstruct insertion and removal of the cutter 40 into and from the guide thimble 19.

Finally, the tube cutter 40 includes means for converting axial movement of the stem 56 between its upper retracted and lower extended positions within the longitudinal bore 44 into radial movement of the respective slides 66 between their respective inward and outward positions. The converting means comprises a pair of inclined surfaces 79 defined on the inner ends of the respective slides 66 and a conical tip defined at portion 58 of the stem 56 with the sides 58a,58b thereof being opposite portions of the continuous conical surface of the tip which has an inclined configuration complementary to the inclined surfaces 79 of the slides 66. The surfaces 79 of the slides 66 are maintained in contact with the conical tip 58 by the inwardly-directed biasing force imposed on the slides 66 by the springs 72. Consequently, as the stem 56 is rotated clockwise and thereby moved axially from its upper retracted position toward its lower extended position, its conical tip 58 moves downwardly relative to the slide surfaces 79, causing the slides 66 to move radially outward away from one another from their inward positions toward their outward positions and against the bias of the springs 72. Then, as the stem 56 is rotated counterclockwise and thereby moved axially from its lower extended position toward its upper retracted position, its conical tip 58 moves upwardly relative to the slide surfaces 79, allowing the slides 66 to move radially inward toward one another from their outward positions toward their inward positions due to the return biasing force imposed thereon by the springs 72.

Operation of the tube cutter 40 may be summarized as follows. One or more tube cutters 40 would typically be mounted on another tool or fixture (not shown) for proper location relative to the guide thimbles to be cut. Multiple tube cutters can be mounted on a fixture for location and actuation in unison. After insertion of the cutter 40 into the guide thimble 19 to be cut, the stem 56 of the cutter 40 is rotated clockwise a predetermined fraction, for instance fifteen to twenty degrees, of a turn or a number of turns, depending upon the pitch of the threads (not shown) interconnecting the stem 56 and the lug 62 on the cutter body 42. Such rotation of the stem 56 also moves it axially downward and via the cam-like action of its conical tip 58 on the slide surfaces 79 moves the slides 66 and cutting wheels 68 outwardly. The shallower the pitch of the threads, the finer can be the radial displacement of the positions of the cutting wheels 68. With the cutting wheels engaged with the interior of the guide thimble sleeve 28, the cutter body 42 is rotated through several revolutions to effect cutting. Then, the stem 56 is again rotated which moves the slides 66 farther outwardly and advances the cutting wheels 68 into positions for effecting a deeper cut into the guide thimble sleeve 28 upon rotation of the cutter body 42 again. This incremental procedure is repeated several times until the stem 56 reaches its extended position at the end of its mechanical travel, which can be adjusted for various thimble wall thicknesses by placing a shim spacer (not shown) under the stem flange 60 to ensure that the wall is severed precisely without overtravel of the cutting wheels 68. At the completion of the cut, the stem 56 is oppositely rotated out of the body 42, whereupon the slides 66 and cutting wheels 68 are retracted by the springs 72. The tube cutter 40 can then be safely withdrawn from the severed guide thimble 19.

Figure 6:
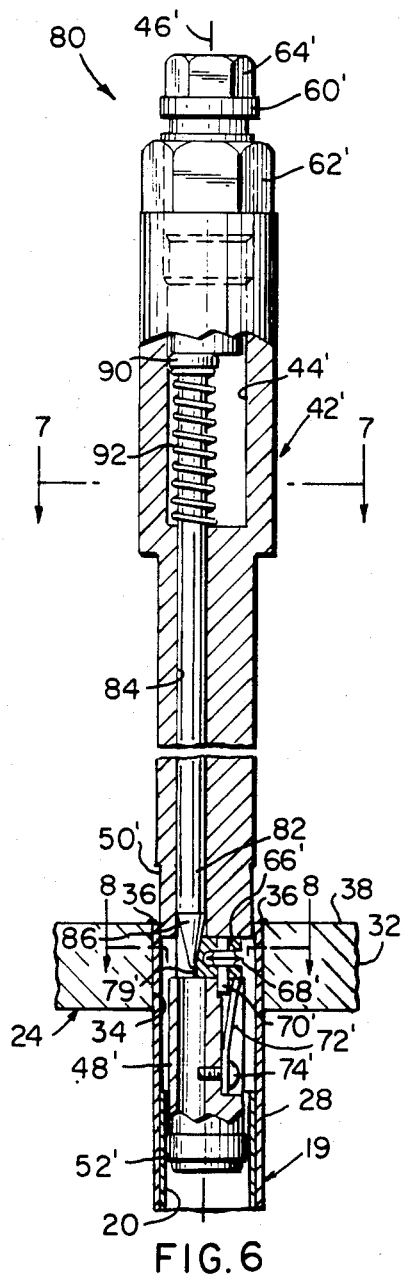
FIG. 6 is a side elevational view, partially in section, of a modified precision internal tube cutter, showing the tube cutter in foreshortened form and disposed within the upper end portion of a guide thimble inserted and attached within a passageway of the top nozzle adapter plate, with the guide thimble and adapter plate being illustrated in fragmentary, sectioned form.
Figure 7:
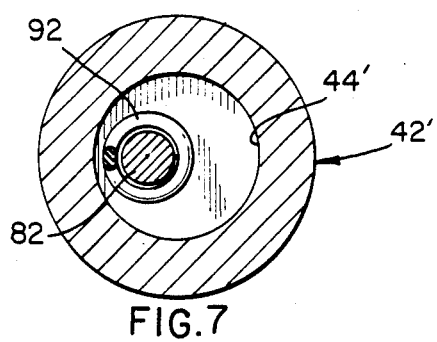
FIGS. 7 and 8 are enlarged cross-sectional views of the modified tube cutter taken along lines 7—7 and 8—8, respectively, of FIG. 6 in the direction of the arrows.
Figure 8:
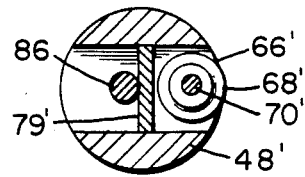

Referring now to FIGS. 6-8, there is shown an alternative embodiment of a tube cutter 80 which is adapted for use in tubes which are relatively smaller than those in which the tube cutter 40 is used. For example, the tube cutter 40 shown in FIGS. 2-5 is suitable for cutting tubes with inside diameters of about one inch or more, while the tube cutter 80 shown in FIGS. 6-8 can be used for cutting tubes with inside diameters between about 0.375 and one inch. As was the case with most of the basic components of the tube cutter 40, the corresponding components of the cutter 80 are also composed of the same noncorrosive, anti-galling stainless steel alloy. Overall, the tube cutter 80 includes several components which are substantially identical in construction and operation to components of the tube cutter 40. Such identical components have been designated in FIGS. 6-8 with the same reference numerals employed in connection with the description of tube cutter 40, but have been differentiated therefrom by means of a prime (') designation. Only the differences between the two tube cutters 40,80 will be discussed.

One primary difference of the tube cutter 80 from the tube cutter 40 is that cutter 80 incorporates only a single slide 66' and associated cutting wheel 68', axle pin 70', and return spring 72'. Another main difference is that the slide 66' and cutting wheel 68' are moved by a pin 82 positioned in an eccentric or axially offset longitudinal bore 84. Similar to the stem 56 of the tube cutter 80, the pin 82 of the cutter 80 has a lower conical tip 86 which engages an inclined surface 79' on the inner end of the slide 56'. The upper end 90 of the pin 82 is adapted for engagement with the lower end of a stem 56' to move the pin 82 downwardly so that the single slide 66' and cutting wheel 68' are advanced radially outward. The pin 82 is normally urged away from the slide 66' by a second return spring 92 provided in the counterbore 44' in order to facilitate retraction of the cutting wheel 68' and slide 66' by the spring 72'. When the stem 56' is disposed in its upper retracted position, as shown in FIG. 6, it allows the slide 66' and cutting wheel 68 therewith to retract within the perimeter of the intermediate portion 48' of the body 42' of the cutter 80.

From the foregoing, it will thus be apparent that the present invention herein comprises an improved internal tube cutter having several advantages over the prior art. By means of the tube cutter herein, guide thimbles attached to a top nozzle can be precisely severed from the inside substantiallly without producing burrs, roughness or deformation at the severed tube ends. The tube cutter herein is well suited for use in tubes of relatively small diameter, and is particularly adapted for use in applications, such as the reconstitution of irradiated fuel assemblies in nuclear power plants, wherein extreme environmental conditions are encountered and extreme precision is required. Other advantages will be evident to those skilled in the art.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or examplary embodiment thereof.

I claim:

1. For use in facilitating reconstitution of a fuel assembly including a stop nozzle having an adapter plate with a plurality of passageways defined through the adapter plate and a plurality of guide thimbles with hollow upper end portions inserted in the passageways and attached to the top nozzle adapter plate at the upper ends of the passageways, a precision internal tube cutter for severing the upper end portion of the guide thimble just below its region of attachment to the top nozzle adapter plate, comprising:

(a) an elongaged body having an upper end portion, means on said portion for rotating said body, a lower end portion, an intermediate portion integrally interconnecting said upper and lower end portions, and a longitudinal bore defined in said body so as to extend axially through said upper end portion and into at least said intermediate portion of said body;

(b) said upper and lower end portions of said body being of generally cylindrical cross-sectional shapes and having respective diameter sizes which adapt them to closely fit within and make guiding contact with the hollow upper end portion of one of the guide thimbles inserted and attached within one of the passageways of the top nozzle adapter plate, said lower end portion of said body being relatively smaller in diameter size than said upper end portion thereof so as to adapt said lower end portion for receipt within a smaller inside diameter size portion of said guide thimble than the inside diameter size of the guide thimble upper end portion in which said upper end portion of said body is received;

(c) said intermediate portion of said body being of a cross-sectional shape reduced in size relative to the respective diameter sizes of said upper and lower end portions which prevents it from making contact with the hollow upper end portion of the guide thimble, said intermediate portion having a radially extending slot formed therein which intersects said longitudinal bore and is composed of opposite slot portions, said intermediate portion including a pair of recessed notches defined therein adjacent said slot portions;

(d) a stem disposed within said longitudinal bore and having a continuous conical surface defined at a lower end thereof which intersects said radial slot so as to divide said slot into opposite portions which open at the exterior of said intermediate body portion, said stem including a flange portion which limits axial movement of said stem, said stem at an upper end being threadably connected to said upper end portion of said body such that upon rotation of said stem relative to said body, said stem will move axially along said bore between an upper retracted position and a lower extended position;

(e) a pair of slides mounted within said respective slot portions and having respective inner ends with surfaces defined thereon having inclined configurations complementary to the inclined configuration of said conical surfaces on said lower end of said stem and disposed adjacent and in contact with said lower end of said stem such that said slides will move radially between outward and inward positions upon corresponding movement of said stem between its lower and upper positions;

(f) a pair of leaf springs mounted on said intermediate body portion and engaged with said slides, said leaf springs each having a pair of opposite ends, one end of each spring being engaged with one of said slides and the other end of each spring being fastened to said intermediate body portion within one of said notches therein, said springs imposing an inwardly-directed biasing force on said slides for maintaining its inclined surfaces in contact with said conical surface of said stem; and (g) a pair of cutting wheels rotatably mounted on said respective slides so as to define a common cutting plane upon rotation of said body within the hollow upper end portion of the guide thimble, said cutting wheels being disposed in outwardly advancing cutting positions which progressively sever the upper end portion of the guide thimble within said common plane as said respective slides are moved from their inward to outward positions and said cutter body is rotated, said cutting wheels being disposed in withdrawn positions when said respective slides are disposed in their inward positions which facilitates insertion and withdrawal of said cutter body into and from the guide thimble;

(h) said cutter body, stem and slides being composed of a non-corrosive, anti-galling stainless steel alloy, such as Nitronic-60, which adapts said cutter to work for extended periods of time on an irradiated partiallly spent fuel assembly submerged in water.

* * * * *